United States Patent
Ding et al.

(10) Patent No.: US 10,916,960 B2
(45) Date of Patent: Feb. 9, 2021

(54) CHARGING CURRENT REGULATION METHOD, REGULATION DEVICE AND TERMINAL

(71) Applicant: YULONG COMPUTER TELECOMMUNICATION SCIENTIFIC (SHENZHEN) CO., LTD., Shenzhen (CN)

(72) Inventors: Zhao-Gang Ding, Shenzhen (CN); Ju-Zhang Wu, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 109 days.

(21) Appl. No.: 16/080,308

(22) PCT Filed: Mar. 31, 2016

(86) PCT No.: PCT/CN2016/078223
§ 371 (c)(1),
(2) Date: Aug. 28, 2018

(87) PCT Pub. No.: WO2017/147964
PCT Pub. Date: Sep. 8, 2017

(65) Prior Publication Data
US 2019/0067974 A1     Feb. 28, 2019

(30) Foreign Application Priority Data
Feb. 29, 2016 (CN) .......................... 2016 1 0113626

(51) Int. Cl.
*H02J 7/00* (2006.01)

(52) U.S. Cl.
CPC .......... *H02J 7/0088* (2013.01); *H02J 7/0029* (2013.01)

(58) Field of Classification Search
CPC ........ H02J 7/0088; H02J 7/00; H02J 7/00718; H02J 7/0091; H02J 7/007192
(Continued)

(56) References Cited

U.S. PATENT DOCUMENTS 8,907,631 B1 * 12/2014 Gurries ................. H02J 7/0071
  320/138
9,232,135 B2 * 1/2016 Kim ......................... G09G 3/20
(Continued)

FOREIGN PATENT DOCUMENTS

| CN | 103812199 | * | 5/2014 |
| CN | 103812199 A | | 5/2014 |
| CN | 103986215 A | | 8/2014 |

*Primary Examiner* — Jerry D Robbins
(74) *Attorney, Agent, or Firm* — ScienBiziP, P.C.

(57) ABSTRACT

A charging current regulation method, a regulation device and a terminal are provided, the method includes: when charging a terminal, detecting temperature values of working components corresponding to each of a plurality of charging integrated circuits in the terminal (202); according to the temperature values of the working components corresponding to each charging integrated circuit, determining final temperature values of the working components corresponding to each charging integrated circuit (204); regulating charging current of the plurality of charging integrated circuits according to a plurality of final temperature values (206). According to the method, when charging a terminal, equalization of a temperature rise of working components in the terminal in different application scenarios can be ensured, thus the temperature rise of the working components in the terminal is prevented from being too high.

14 Claims, 4 Drawing Sheets

(58) Field of Classification Search
USPC .......................................................... 320/150
See application file for complete search history.

(56) References Cited

U.S. PATENT DOCUMENTS

| | | | | |
|---|---|---|---|---|
| 9,268,378 | B2* | 2/2016 | Rotem | G06F 1/203 |
| 10,001,800 | B1* | 6/2018 | Takayanagi | G06F 1/3243 |
| 10,079,496 | B2* | 9/2018 | Huang | H02J 7/0045 |
| 10,122,193 | B2* | 11/2018 | Lin | H01M 10/44 |
| 10,564,686 | B2* | 2/2020 | Lee | G06F 1/325 |
| 2014/0084856 | A1 | 3/2014 | Howard et al. | |
| 2014/0141845 | A1* | 5/2014 | Li | H04M 1/72527 |
| | | | | 455/573 |
| 2015/0006937 | A1* | 1/2015 | Rotem | G06F 1/3243 |
| | | | | 713/324 |
| 2015/0137741 | A1* | 5/2015 | Gurries | H02J 7/0071 |
| | | | | 320/107 |
| 2016/0064979 | A1* | 3/2016 | Huang | H02J 2207/40 |
| | | | | 320/114 |
| 2016/0116952 | A1* | 4/2016 | Lee | G06F 1/1626 |
| | | | | 700/299 |
| 2016/0181849 | A1* | 6/2016 | Govindaraj | H02J 7/025 |
| | | | | 320/108 |
| 2017/0222465 | A1* | 8/2017 | Hawley | H02J 7/0047 |

* cited by examiner

| Charging current regulation device 300 |
|---|
| Terminal 400 |

FIG. 4

CHARGING CURRENT REGULATION METHOD, REGULATION DEVICE AND TERMINAL

FIELD

The embodiments of the present disclosure relates to a technical field of terminals, specifically a charging current regulation method, a charging current regulation device and a terminal.

BACKGROUND

At present, in a multi-channel charging solution, charging current of each of a plurality of charging integrated circuits is fixed, as shown in FIG. 1, charging current of a main charging Integrated Circuit (IC) and an auxiliary charging IC are fixed and cannot be dynamically regulated while a terminal is charging. The terminal (e.g., a mobile phone) in different application scenarios, heat emitted by working components in the terminal can be different. For example, when the mobile phone is in communication, a radio frequency power amplifier component can result in greater temperature rise, while the mobile phone being used for watching videos, a Central Processing Unit (CPU) can result in greater temperature rise. Therefore, when the terminal is being charged, as the charging current of each charging IC is fixed, when a proportion of the charging current of the plurality of charging integrated circuits is an optimal proportion in a corresponding conversation scene, the proportion cannot be optimal in a scene of watching videos, thus the temperature rise of a position closer to the CPU at the moment is more prominent, and a user experience is influenced.

Thus, how to dynamically regulate the charging current of a plurality of charging integrated circuits to ensure equalization of the temperature rise of the working components in the terminal in different application scenarios becomes an urgent problem to be solved at present.

SUMMARY

In view of the above, a first aspect of the present disclosure provides a charging current regulation method, which includes that: when charging a terminal, detecting temperature values of working components corresponding to each of a plurality of charging integrated circuits in the terminal; according to the temperature values of the working components corresponding to each charging integrated circuit, determining final temperature values of the working components corresponding to each charging integrated circuit; regulating charging current of the plurality of charging integrated circuits according to a plurality of final temperature values.

In the above technical solution, optionally, the step of regulating charging current of the plurality of charging integrated circuits according to the plurality of final temperature values specifically includes: according to the plurality of final temperature values, determining a reference temperature value; comparing the plurality of final temperature values of the working components corresponding to each charging integrated circuit with the reference temperature value to regulate the charging current of the each charging integrated circuit according to a comparison result.

The step of regulating the charging current of each charging integrated circuit according to the comparison result includes: when a final temperature value of a working component corresponding to any of the charging integrated circuits is larger than the reference temperature value, reducing the charging current of the any of the charging integrated circuits; or when the final temperature value of the working component corresponding to any of the charging integrated circuits is smaller than the reference temperature value, increasing the charging current of the any of the charging integrated circuits.

In any of the above technical solutions, optionally, the step of comparing the plurality of final temperature values of the working components corresponding to each charging integrated circuit with the reference temperature value to regulate the charging current of the each charging integrated circuit according to the comparison result, specifically includes: when a difference value between any final temperature value and the reference temperature value is larger than a preset threshold value, regulating the charging current of a charging integrated circuit corresponding to the any final temperature value.

In any of the above technical solutions, optionally, the method further includes: according to a distance between each charging integrated circuit and the plurality of working components in the terminal, setting corresponding relation between each charging integrated circuit and at least one working component of the plurality of working components.

In any of the above technical solutions, optionally, a sum of the charging current of the plurality of charging integrated circuits remains unchanged.

In a second aspect of the present disclosure provides a charging current regulation device, which includes: a detection unit that detects temperature values of working components corresponding to each of a plurality of charging integrated circuits in the terminal when charging a terminal; a determination unit that determines final temperature values of the working components corresponding to each charging integrated circuit according to the temperature values of the working components corresponding to each charging integrated circuit; a regulation unit that regulates charging current of the plurality of charging integrated circuits according to a plurality of final temperature values.

In the above technical solution, optionally, the regulation unit includes that: a determination subunit configured to determine a reference temperature value according to the plurality of final temperature values; a regulation subunit configured to compare the plurality of final temperature values of the working components corresponding to each charging integrated circuit with the reference temperature value to regulate the charging current of the each charging integrated circuit according to a comparison result.

The step of regulating the charging current of each charging integrated circuit according to the comparison result includes: when a final temperature value of a working component corresponding to any of the charging integrated circuits is larger than the reference temperature value, reducing the charging current of the any of the charging integrated circuits; or when the final temperature value of the working component corresponding to any of the charging integrated circuits is smaller than the reference temperature value, increasing the charging current of the any of the charging integrated circuits.

In any of the above technical solutions, optionally, the regulation subunit specifically configured to regulate the charging current of a charging integrated circuit corresponding to the any final temperature value, when a difference value between any final temperature value and the reference temperature value is larger than a preset threshold value.

In any of the above technical solutions, optionally, the device further includes that: a setting unit configured to set corresponding relation between each charging integrated circuit and at least one working component of the plurality of working components according to a distance between each charging integrated circuit and the plurality of working components in the terminal.

In any of the above technical solutions, optionally, a sum of the charging current of the plurality of charging integrated circuits remains unchanged.

In a third aspect of the present disclosure provides a terminal, which includes a charging current regulation device described in any one of above technical solutions. Therefore, the terminal has same technical effect as the charging current regulation device described in any one of the above technical solutions.

BRIEF DESCRIPTION OF THE DRAWINGS

FIG. 4 is a schematic structural diagram of a terminal according to an embodiment of the present disclosure.

DETAILED DESCRIPTION

In order to understand above objects, features and advantages of the present disclosure more clearly, a further detailed description of the present disclosure will be described below with reference to accompanying drawings and specific implementation modes. It should be noted that under the condition that no conflict exists, embodiments of the present disclosure and the features in the embodiments can be mixed and combined with each other.

Many specific details are set forth in the following description to facilitate understanding of the present disclosure completely, however, the present disclosure may also be implemented in other ways other than those described herein, a protection scope of the present disclosure is not limited by the specific embodiments disclosed below.

Figure 1:
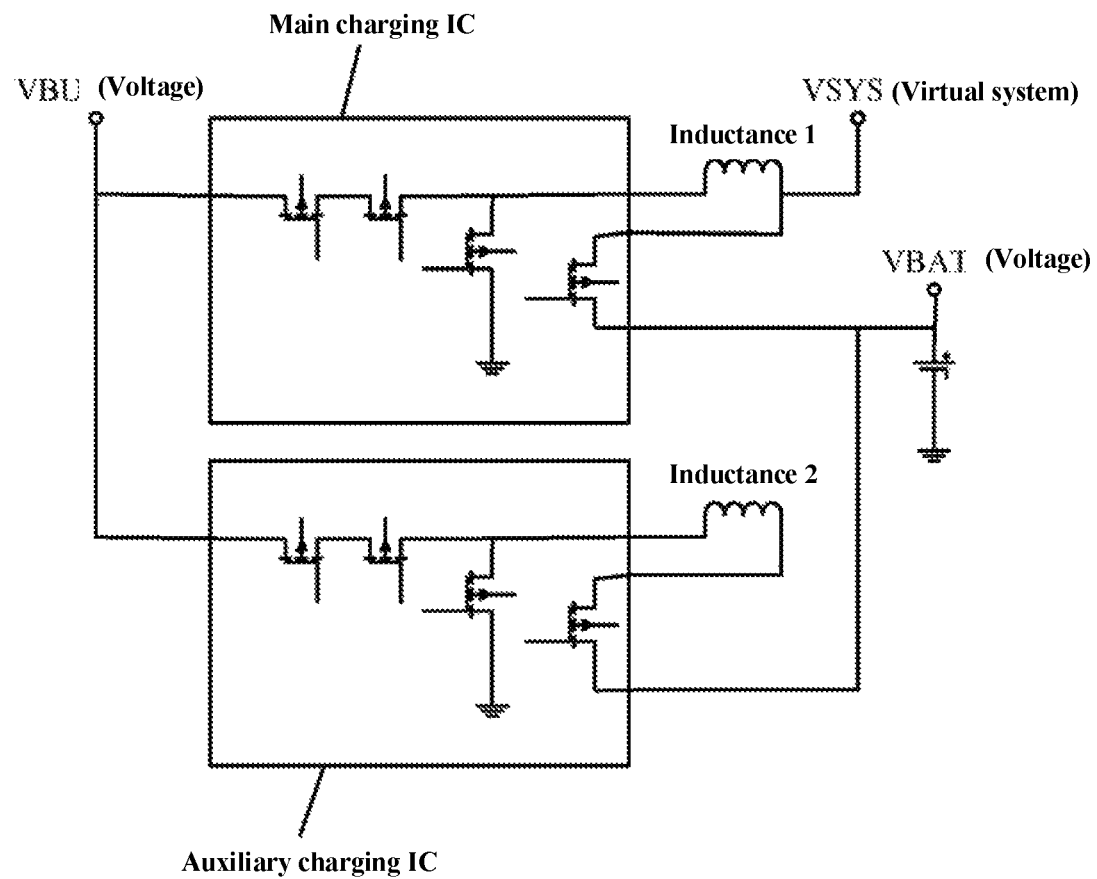
FIG. 1 shows a schematic diagram of a dual-channel charging integrated circuit in prior art.
Figure 2:
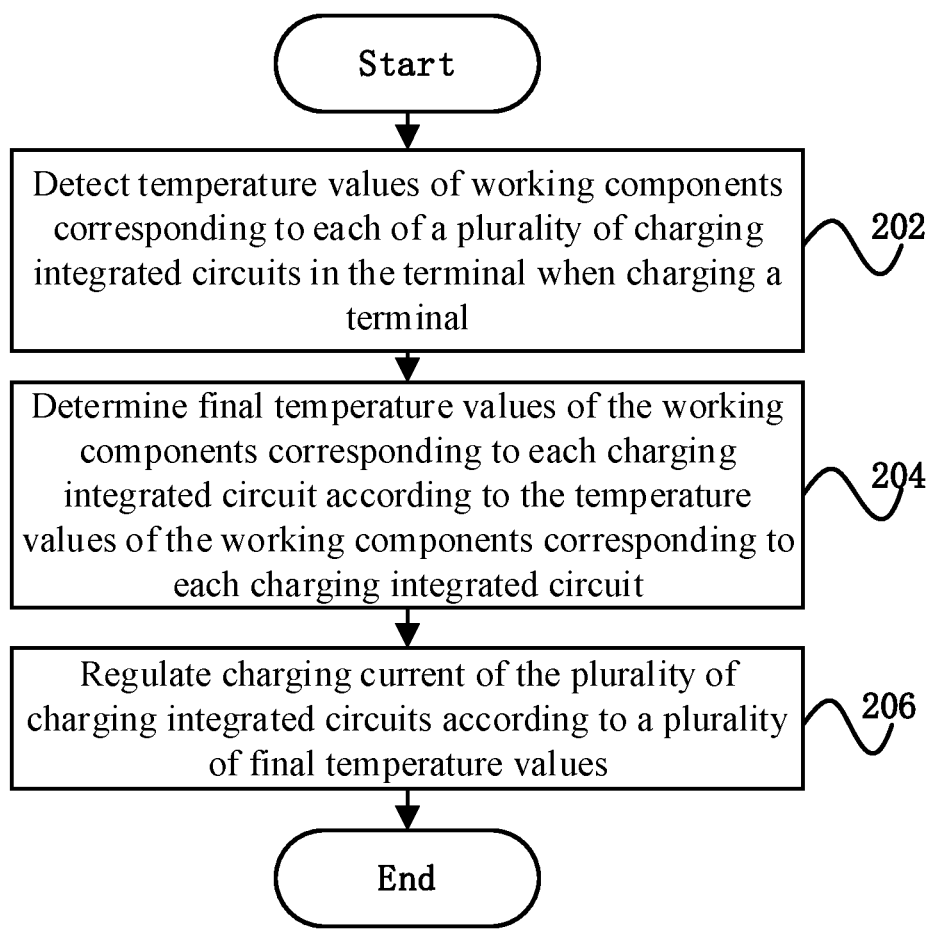
FIG. 2 shows a schematic flowchart of a charging current regulation method according to an embodiment of the present disclosure.

FIG. 2 shows a schematic flowchart of a charging current regulation method according to an embodiment of the present disclosure.

As shown in FIG. 2, the charging current regulation method according to the embodiment of the present disclosure includes:

Step 202, when charging a terminal, detecting temperature values of working components corresponding to each of a plurality of charging integrated circuits in the terminal.

Step 204, according to the temperature values of the working components corresponding to each charging integrated circuit, determining final temperature values of the working components corresponding to each of the charging integrated circuits.

Step 206, regulating charging current of the plurality of charging integrated circuits according to a plurality of the final temperature values.

In the technical solution, when charging the terminal, the temperature values of the working components corresponding to the each charging integrated circuit are different. When each charging integrated circuit corresponds to a plurality of working components, an average value (or a variance) of the temperature values of the plurality of working components can be calculated, and the average value (or the variance, etc.) can be regarded as the final temperature value. When each charging integrated circuit corresponds to one working component, the temperature value of the working component is regarded as the final temperature value, furthermore, the charging current of the plurality of charging integrated circuits is regulated according to the final temperature values, thus the temperatures of the working components corresponding to the plurality of charging integrated circuits can be kept consistent or made difference values between the temperatures be smaller by regulating the charging current. Accordingly, a purpose of the equalization of the temperature rise of working components in the terminal is achieved. Therefore, when the terminal is in any application scene, a situation that the temperature rise of the working component corresponding to the any application scene is high can be avoided, then the user experience is improved.

For example, when the terminal is being charged, and the terminal is being used for voice communication, a radio frequency power amplifier component causes a greater temperature rise, and temperature of the Central Processing Unit (CPU) is lower. Then, in one aspect, charging current of a charging integrated circuit corresponding to the radio frequency power amplifier component is reduced to reduce temperature of the charging integrated circuit. Due to a distance between the radio frequency power amplifier component and the charging integrated circuit corresponding to the radio frequency power amplifier component is closer, the temperature of the vicinity of the radio frequency power amplifier component is correspondingly reduced. In another aspect, charging current of a charging integrated circuit corresponding to the CPU is increased to ensure charging speed of the terminal. At this point, a temperature of the charging integrated circuit corresponding to the CPU is increased, due to a distance between the CPU and the charging integrated circuit corresponding to the CPU is closer, the temperature of the vicinity of the CPU is correspondingly integrated, thus equalization of the temperature between the radio frequency power amplifier component and the CPU is achieved.

In the above technical solution, optionally, the step 206 specifically includes: according to the plurality of final temperature values, determining a reference temperature value; comparing the plurality of final temperature values of the working components corresponding to each charging integrated circuit with the reference temperature value to regulate the charging current of the each charging integrated circuit according to a comparison result.

In the technical solution, the reference temperature value can be determined according to the final temperature value corresponding to each charging integrated circuit. For example, an average value of a plurality of final temperature values corresponding to the plurality of charging integrated circuits can be calculated, and the average value is used as the reference temperature value, which is the temperature value that should be kept by the working components in the terminal. Thus the temperature values of the working components corresponding to the each charging integrated circuit can be kept consistent or made difference values between the temperatures be smaller by regulating the charging current of each charging integrated circuit.

The step of regulating the charging current of each charging integrated circuit according to the comparison result includes: when a final temperature value of a working component corresponding to any of the charging integrated circuits is larger than the reference temperature value, reducing the charging current of the any of the charging integrated circuits; or when the final temperature value of the working component corresponding to any of the charging integrated circuits is smaller than the reference temperature value, increasing the charging current of the any of the charging integrated circuits.

For example, a Wi-Fi module and a CPU module correspond to a first charging integrated circuit, and a radio frequency power amplifier component corresponds to a second charging integrated circuit. When the terminal is charging, and a webpage is browsed through Wi-Fi for surfing the Internet, and a temperature value of the Wi-Fi module is detected to be 36° C., and a temperature value of the CPU module is 39° C., and a temperature value of the radio frequency power amplifier component is 33° C., average values of the temperature value of the Wi-Fi module and the temperature value of the CPU module are calculated, and a final temperature value of working components corresponding to the first charging integrated circuit is obtained to be 37.5° C. Due to the second charging integrated circuit only corresponding to one radio frequency power amplifier component, the temperature value of the radio frequency power amplifier component is used as a final temperature value of working components corresponding to the second charging integrated circuit, namely 33° C. Then, an average value of the final temperature value of the working components corresponding to the first charging integrated circuit and the final temperature value of the working components corresponding to the second charging integrated circuit is calculated as the reference temperature value, and the reference temperature value is 35.25° C. It can be seen that the final temperature value 37.5° C. of the working components corresponding to the first charging integrated circuit is higher than the final temperature value 32.5° C. of the working components corresponding to the second charging integrated circuit, and the charging current of the first charging integrated circuit is reduced; and the final temperature value 33° C. of the working components corresponding to the second charging integrated circuit is lower than the reference temperature value 35.25° C., and the charging current of the first charging integrated circuit is increased, thus the temperature values of the Wi-Fi module, the CPU module and the radio frequency power amplifier component are balanced.

In any of the above technical solutions, optionally, the step of comparing the plurality of final temperature values of the working components corresponding to each charging integrated circuit with the reference temperature value to regulate the charging current of the each charging integrated circuit according to the comparison result, specifically includes: when a difference value between any final temperature value and the reference temperature value is larger than a preset threshold value, regulating charging current of a charging integrated circuit corresponding to the any final temperature value.

In the technical solution, when the difference value between any final temperature value and the reference temperature value is larger than the preset threshold value, namely the final temperature value is higher or lower, that is, the temperature value of the working component in the terminal are high or low, that is, the working component in the terminal does not reach an optimal working state (namely the equalization of the temperature value), and then the charging current of the charging integrated circuit corresponding to the any final temperature value can be regulated. Thus the temperature value of the working component of the terminal can be kept consistent or made the difference value of the temperature value be small by regulating the charging current; otherwise, when the difference value between any final temperature value and the reference temperature value is smaller than the preset threshold value, that is, the any final temperature value is already an appropriate temperature value, and then the charging current of the charging integrated circuit corresponding to the any final temperature value does need not to be regulated.

For example, the final temperature value 37.5° C. of the working components corresponding to the first charging integrated circuit is 2.25° C. higher than the reference temperature value 35.25° C., obviously, 2.25° C. is higher than the preset threshold value 1° C., the charging current of the first charging integrated circuit is reduced; the final temperature value 33° C. of the working components corresponding to the second charging integrated circuit is 2.25° C. lower than the reference temperature value 35.25° C., obviously, 2.25° C. is higher than the preset threshold value 1° C., the charging current of the first charging integrated circuit is increased.

In any of the above technical solutions, optionally, the method further includes: according to a distance between each charging integrated circuit and the plurality of working components in the terminal, setting corresponding relation between each charging integrated circuit and at least one working component of the plurality of working components.

In the technical solution, according to the distance between each charging integrated circuit and the plurality of working components in the terminal, the corresponding relation between each charging integrated circuit and the at least one working component is set. For example, when a distance between any charging integrated circuit and a radio frequency power amplifier component and a distance between the any charging integrated circuit and a processor are both less than 1 cm, thus the corresponding relation between the any charging integrated circuit and the radio frequency power amplifier component and the processor can be set.

In any of the above technical solutions, optionally, a sum of the charging current of the plurality of charging integrated circuits remains unchanged.

In the technical solution, the sum of the charging currents before and after regulation of the plurality of charging integrated circuits is the same, thus the equalization of the temperature rise of the working components in the terminal can be realized on the basis that a charging speed of the terminal is not changed, thus a situation that the charging speed of the terminal is reduced, due to regulating a sum of charging current of the plurality of charging integrated circuits in a related technology, can be avoided, thereby avoiding influencing the user experience.

Figure 3:
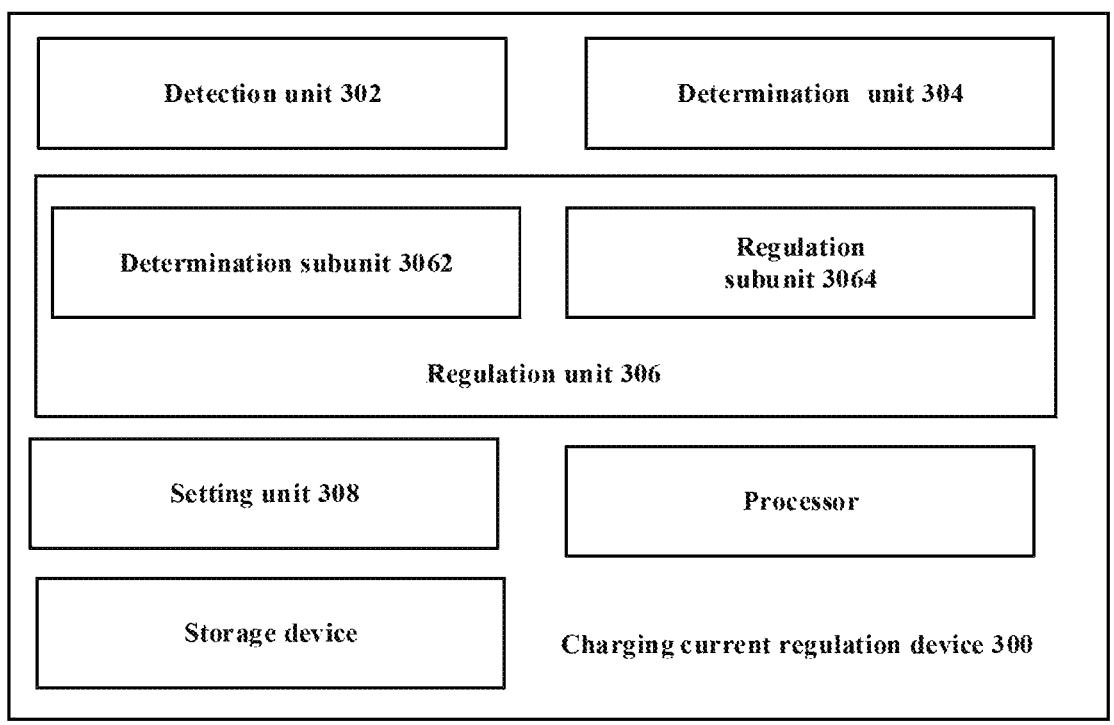
FIG. 3 shows a schematic structural diagram of a charging current regulation device according to an embodiment of the present disclosure.

FIG. 3 shows a schematic structural diagram of a charging current regulation device according to an embodiment of the present disclosure.

As shown in FIG. 3, a charging current regulation device 300 according to an embodiment of the present disclosure includes: a detection unit 302, a determination unit 304, a regulation unit 306. The detection unit 302 is configured to detect temperature values of working components corresponding to each of a plurality of charging integrated circuits in the terminal when charging a terminal; the determination unit 304 is configured to determine final temperature values of the working components corresponding to each charging integrated circuit according to the temperature values of the working components corresponding to each charging integrated circuit; the regulation unit 306 configured to regulate charging current of the plurality of charging integrated circuits according to a plurality of final temperature values.

In the technical solution, when charging the terminal, the temperature values of the working components corresponding to the each charging integrated circuit are different. When each charging integrated circuit corresponds to a plurality of working components, an average value (or a variance) of the temperature values of the plurality of working components can be calculated, and the average value (or the variance, etc.) can be regarded as the final temperature value. When each charging integrated circuit corresponds to one working component, the temperature value of the working component is regarded as the final temperature value, furthermore, the charging current of the plurality of charging integrated circuits is regulated according to the final temperature values, thus the temperatures of the working components corresponding to the plurality of charging integrated circuits can be kept consistent or made difference values between the temperatures be smaller by regulating the charging current. Accordingly, a purpose of the equalization of the temperature rise of working components in the terminal is achieved. Therefore, when the terminal is in any application scene, a situation that the temperature rise of the working component corresponding to the any application scene is high can be avoided, then the user experience is improved.

For example, when the terminal is being charged, and the terminal is being used for telephoning, a radio frequency power amplifier component causes a greater temperature rise, temperature of the Central Processing Unit (CPU) is lower. Then, in one aspect, charging current of a charging integrated circuit corresponding to the radio frequency power amplifier component is reduced to reduce temperature of the charging integrated circuit. Due to a distance between the radio frequency power amplifier component and the charging integrated circuit corresponding to the radio frequency power amplifier component is closer, the temperature in the vicinity of the radio frequency power amplifier component is correspondingly reduced. In another aspect, charging current of a charging integrated circuit corresponding to the CPU is increased to ensure charging speed of the terminal. At this point, a temperature of the charging integrated circuit corresponding to the CPU is increased, due to a distance between the CPU and the charging integrated circuit corresponding to the CPU is closer, the temperature in the vicinity of the CPU is correspondingly integrated, thus equalization of the temperature between the radio frequency power amplifier component and the CPU is achieved.

In the above technical solution, optionally, the regulation unit 306 includes that: a determination subunit 3062 configured to determine a reference temperature value according to the plurality of final temperature values; a regulation subunit 3064 configured to compare the plurality of final temperature values of the working components corresponding to each charging integrated circuit with the reference temperature value to regulate the charging current of the each charging integrated circuit according to a comparison result.

In the technical solution, the reference temperature value can be determined according to the final temperature value corresponding to each charging integrated circuit. For example, an average value of a plurality of final temperature values corresponding to the plurality of charging integrated circuits can be calculated, and the average value is used as the reference temperature value, which is the temperature value that should be kept by the working components in the terminal. Thus the temperature values of the working components corresponding to the each charging integrated circuit can be kept consistent or made difference values between the temperatures be smaller by regulating the charging current of each charging integrated circuit.

The step of regulating the charging current of each charging integrated circuit according to the comparison result includes: when a final temperature value of a working component corresponding to any of the charging integrated circuits is larger than the reference temperature value, reducing the charging current of the any of the charging integrated circuits; or when the final temperature value of the working component corresponding to any of the charging integrated circuits is smaller than the reference temperature value, increasing the charging current of the any of the charging integrated circuits.

For example, a Wi-Fi module and a CPU module correspond to a first charging integrated circuit, and a radio frequency power amplifier component corresponds to a second charging integrated circuit. When the terminal is charging, and a webpage is browsed through Wi-Fi for surfing the Internet, and a temperature value of the Wi-Fi module is detected to be 36° C., and a temperature value of the CPU module is 39° C., and a temperature value of the radio frequency power amplifier component is 33° C., average values of the temperature value of the Wi-Fi module and the temperature value of the CPU module are calculated, and a final temperature value of working components corresponding to the first charging integrated circuit is obtained to be 37.5° C. Due to the second charging integrated circuit only corresponding to one radio frequency power amplifier component, the temperature value of the radio frequency power amplifier component is used as a final temperature value of working components corresponding to the second charging integrated circuit, namely 33° C. Then, an average value of the final temperature value of the working components corresponding to the first charging integrated circuit and the final temperature value of the working components corresponding to the second charging integrated circuit is calculated as the reference temperature value, and the reference temperature value is 35.25° C. It can be seen that the final temperature value 37.5° C. of the working components corresponding to the first charging integrated circuit is higher than the final temperature value 32.5° C. of the working components corresponding to the second charging integrated circuit, and the charging current of the first charging integrated circuit is reduced; and the final temperature value 33° C. of the working components corresponding to the second charging integrated circuit is lower than the reference temperature value 35.25° C., and the charging current of the first charging integrated circuit is increased, thus the temperature values of the Wi-Fi module, the CPU module and the radio frequency power amplifier component are balanced.

In any of the above technical solutions, optionally, the regulation subunit 3064 specifically configured to regulate charging current of a charging integrated circuit corresponding to any final temperature value, when a difference value between the any final temperature value and the reference temperature value is larger than a preset threshold value.

In the technical solution, when the difference value between any final temperature value and the reference temperature value is larger than the preset threshold value, namely the final temperature value is higher or lower, that is, the temperature value of the working component in the terminal are high or low, that is, the working component in the terminal does not reach an optimal working state (namely the equalization of the temperature value), and then the charging current of the charging integrated circuit corresponding to the any final temperature value can be regulated. Thus the temperature value of the working component of the terminal can be kept consistent or made the difference value of the temperature value be small by regulating the charging current; otherwise, when the difference value between any final temperature value and the reference temperature value is smaller than the preset threshold value, that is, the any final temperature value is already an appropriate temperature value, and then the charging current of the charging integrated circuit corresponding to the any final temperature value need not to be regulated.

For example, the final temperature value 37.5° C. of the working components corresponding to the first charging integrated circuit is 2.25° C. higher than the reference temperature value 35.25° C., obviously, 2.25° C. is higher than the preset threshold value 1, ° C., the charging current of the first charging integrated circuit is reduced; the final temperature value 33° C. of the working components corresponding to the second charging integrated circuit is 2.25° C. lower than the reference temperature value 35.25° C., obviously, 2.25° C. is higher than the preset threshold value 1° C., the charging current of the first charging integrated circuit is increased.

In any of the above technical solutions, optionally, the device further includes that: a setting unit 308 configured to set corresponding relation between each charging integrated circuit and at least one working component of the plurality of working components according to a distance between each charging integrated circuit and the plurality of working components in the terminal.

In the technical solution, according to the distance between each charging integrated circuit and the plurality of working components in the terminal, the corresponding relation between each charging integrated circuit and the at least one working component is set. For example, when a distance between any charging integrated circuit and a radio frequency power amplifier component and a distance between the any charging integrated circuit and a processor are both less than 1 cm, thus the corresponding relation between the any charging integrated circuit and the radio frequency power amplifier component and the processor can be set.

In any of the above technical solutions, optionally, a sum of the charging current of the plurality of charging integrated circuits remains unchanged.

In the technical solution, the sum of the charging currents before and after regulation of the plurality of charging integrated circuits is the same, thus the equalization of the temperature rise of the working components in the terminal can be realized on the basis that a charging speed of the terminal is not changed, thus a situation that the charging speed of the terminal is reduced, due to regulating a sum of charging current of the plurality of charging integrated circuits in a related technology, can be avoided, thereby avoiding influencing the user experience.

FIG. 4 is a schematic structural diagram of a terminal according to an embodiment of the present disclosure.

As shown in FIG. 4, a terminal 400 according to an embodiment of the present disclosure includes: a charging current regulation device 300 described in any one of above technical solutions. Therefore, the terminal 400 has same technical effect as the charging current regulation device 300 described in any one of the above technical solutions.

The following describes a specific solution for dynamically regulating the charging current of a plurality of charging integrated circuits.

When two charging integrated circuits are included in the terminal, for each high-power working component (such as a radio frequency power amplifier component and a CPU) in a mobile phone, when there is no integrated temperature sensor in the high-power working component, an additional temperature sensor is placed near the high-power working component, for example, a temperature sensor placed at the radio frequency power amplifier component is a sensor PA, a temperature sensor placed at the CPU is a sensor CPU.

When a position of a main charging IC (Integrated Circuit) in the two charging integrated circuits is closer to a position of the radio frequency power amplifier component (that is, the main charging IC is in relation to the radio frequency power amplifier component correspondingly); a position of an auxiliary charging IC is closer to a position of the CPU (that is, the auxiliary charging IC is in relation to the CPU correspondingly).

When a temperature value detected by the sensor PA is larger than a temperature value detected by the sensor CPU, charging current of the main charging IC is reduced, charging current of the auxiliary charging IC is increased, and a sum of charging current of the main charging IC and the auxiliary charging IC are unchanged.

When the temperature value detected by the sensor PA is lower than the temperature value detected by the sensor CPU, charging current of the main charging IC is increased, charging current of the auxiliary charging IC is reduced, and a sum of charging current of the main charging IC and the auxiliary charging IC are unchanged.

When the temperature value detected by the sensor PA is equal to the temperature value detected by the sensor CPU, the best state is reached.

When three charging integrated circuits are included in the terminal, such as a first charging integrated circuit, a second charging integrated circuit and a third charging integrated circuit. A working component corresponding to the first charging integrated circuit is a radio frequency amplifier component (a temperature value of the radio frequency power amplifier component is detected to be 38° C.), a CPU (a temperature value of the CPU is detected to be 32° C.), a working component corresponding to the second charging integrated circuit is a Wi-Fi module (a temperature value of the Wi-Fi module is detected to be 28° C.), a working component corresponding to the third charging integrated circuit is a BLUETOOTH™ module (a temperature value of the BLUETOOTH™ module is detected to be 36° C.), a final temperature value corresponding to the first charging integrated circuit can be determined to be 35° C. (namely an average temperature value of the radio frequency amplifier component and the CPU), a final temperature value corresponding to the second charging integrated circuit can be determined to be 28° C. (the temperature value of the Wi-Fi module is directly taken as the final temperature value), a final temperature value corresponding to the third charging integrated circuit can be determined to be 36° C.

After determining the final temperature value for each charge integrated circuit, a reference temperature value can be determined according to three final temperature values of the three charging integrated circuits, namely, 33° C. (i.e, an average value of the three final temperature values is calculated, thus the average value is used as the reference temperature value), moreover, a difference value between the final temperature value (35° C.) corresponding to the first charging integrated circuit and the reference temperature value (33° C.) can be determined to be 2° C. (a preset threshold value is 2° C.), the charging current of the first charging integrated circuit is not regulated. Meanwhile, a difference value between the final temperature value (28° C.) corresponding to the second charging integrated circuit and the reference temperature value (33° C.) can be determined to be 5° C., the difference value is 2° C. higher than the preset threshold value, then the charging current of the second charging integrated circuit is increased. In addition, a difference value between the final temperature value (36° C.) corresponding to the third charging integrated circuit and the reference temperature value (33° C.) can be determined to be 3° C., the difference value is 2° C. higher than the preset threshold value, then the charging current of the third charging integrated circuit is reduced.

When regulating the charging current of the second charging integrated current and the charging current of the third charging integrated circuit, the sum of the three charging integrated currents should be ensured to be unchanged.

A technical solution of the present disclosure is described in detail with reference to drawings. Through the technical solution of the present disclosure, when charging a terminal, equalization of temperature rise of working components in the terminal in different application scenarios can be ensured, thus the temperature rise of the working components in the terminal is prevented from being too high, and then a user experience is improved.

Above descriptions are only preferred embodiments of the present disclosure, and are not intended to limit the present disclosure. For technicians in the field, the present disclosure can be modified and changed. Any modification is made without departing from the spirit and principle of the present disclosure, equivalent replacement, improvement and the like are all included in the protection scope of the present disclosure.

We claim:

1. A charging current regulation method, comprising:
   when charging a terminal, detecting temperature values of working components in the terminal corresponding to each of a plurality of charging integrated circuits in the terminal;
   according to the temperature values of the working components corresponding to each of the plurality of charging integrated circuits, determining final temperature values of the working components corresponding to each of the plurality of charging integrated circuits, wherein the final temperature value is determined by calculating an average value of the temperature values of the working components;
   regulating charging current of the plurality of charging integrated circuits according to the final temperature values, wherein regulating charging current of the plurality of charging integrated circuits according to the final temperature values comprises: according to the final temperature values, determining a reference temperature value; comparing the final temperature values of the working components corresponding to each of the plurality of charging integrated circuits with the reference temperature value to regulate the charging current of the each of the plurality of charging integrated circuits according to a comparison result, wherein the reference temperature value is determined by calculating an average value of the temperature values of the final temperature values.

2. The charging current regulation method of claim 1, wherein comparing final temperature values of the working components corresponding to each of the plurality of charging integrated circuits with the reference temperature value to regulate the charging current of the each of the plurality of charging integrated circuits according to the comparison result comprises:
   when a difference value between any final temperature value and the reference temperature value is larger than a preset threshold value, regulating charging current of a charging integrated circuit corresponding to the any final temperature value.

3. The charging current regulation method of claim 1, further comprising:
   according to a distance between each of the plurality of charging integrated circuits and the working components, setting a corresponding relation between each of the plurality of charging integrated circuits and at least one working component of the working components.

4. The charging current regulation method of claim 1, wherein a sum of the charging current of the plurality of charging integrated circuits remains unchanged.

5. The charging current regulation method of claim 1, wherein regulating the charging current of the each of the plurality of charging integrated circuits according to the comparison result comprises:
   when the final temperature value of a working component corresponding to any of the charging integrated circuits is larger than the reference temperature value, reducing the charging current of the any of the charging integrated circuits; or
   when the final temperature value of the working component corresponding to any of the charging integrated circuits is smaller than the reference temperature value, increasing the charging current of the any of the charging integrated circuits.

6. A terminal, comprising:
   at least one processor; and
   a storage device storing a plurality of instructions, which when executed by the processor, causes the at least one processor to:
   detect temperature values of working components in the terminal corresponding to each of a plurality of charging integrated circuits in the terminal when charging the terminal;
   determine final temperature values of the working components corresponding to each of the plurality of charging integrated circuits according to the temperature values of the working components corresponding to each of the plurality of charging integrated circuits, wherein the final temperature value is determined by calculating an average value of the temperature values of the working components;
   regulate charging current of the plurality of charging integrated circuits according to the final temperature values, wherein the at least one processor further:
   determines a reference temperature value according to the final temperature values; compares the final temperature values of the working components corresponding to each of the plurality of charging integrated circuits with the reference temperature value to regulate the charging current of the each of the plurality of charging integrated circuits according to a comparison result, wherein the reference temperature value is determined by calculating an average value of the temperature values of the final temperature values.

7. The terminal of claim 6, wherein the at least one processor further:

regulates charging current of a charging integrated circuit corresponding to the any final temperature value, when a difference value between any final temperature value and the reference temperature value is larger than a preset threshold value.

8. The terminal of claim 6, wherein the at least one processor further:
sets corresponding relation between each of the plurality of charging integrated circuits and at least one working component of working components according to a distance between each of the plurality of charging integrated circuits and the working components.

9. The terminal of claim 6, wherein a sum of the charging current of the plurality of charging integrated circuits remains unchanged.

10. The terminal of claim 6, wherein the at least one processor further:
when the final temperature value of a working component corresponding to any of the charging integrated circuits is larger than the reference temperature value, reducing the charging current of the any of the charging integrated circuits; or
when the final temperature value of the working component corresponding to any of the charging integrated circuits is smaller than the reference temperature value, increasing the charging current of the any of the charging integrated circuits.

11. A non-transitory storage medium having stored thereon instructions that, when executed by a processor of a terminal, causes the processor of the terminal to perform a charging current regulation method, the charging current regulation method comprising:
when charging a terminal, detecting temperature values of working components in the terminal corresponding to each of a plurality of charging integrated circuits in the terminal;
according to the temperature values of the working components corresponding to each of the plurality of charging integrated circuits, determining final temperature values of the working components corresponding to each of the plurality of charging integrated circuits, wherein the final temperature value is determined by calculating an average value of the temperature values of the working components;
regulating charging current of the plurality of charging integrated circuits according to the final temperature values, wherein regulating charging current of the plurality of charging integrated circuits according to the final temperature values comprises: according to the final temperature values, determining a reference temperature value; comparing the final temperature values of the working components corresponding to each of the plurality of charging integrated circuits with the reference temperature value to regulate the charging current of the each of the plurality of charging integrated circuits according to a comparison result, wherein the reference temperature value is determined by calculating an average value of the temperature values of the final temperature values.

12. The non-transitory storage medium according to claim 11, wherein comparing final temperature values of the working components corresponding to each of the plurality of charging integrated circuits with the reference temperature value to regulate the charging current of the each of the plurality of charging integrated circuits according to the comparison result comprises:
when a difference value between any final temperature value and the reference temperature value is larger than a preset threshold value, regulating charging current of a charging integrated circuit corresponding to the any final temperature value.

13. The non-transitory storage medium according to claim 11, wherein the charging current regulation method further comprises:
according to a distance between each of the plurality of charging integrated circuits and a plurality of working components in the terminal, setting a corresponding relation between each of the plurality of charging integrated circuits and at least one working component of the plurality of working components.

14. The non-transitory storage medium according to claim 11, wherein a sum of the charging current of the plurality of charging integrated circuits remains unchanged.

* * * * *